United States Patent [19]
Milner et al.

[11] Patent Number: 5,984,720
[45] Date of Patent: Nov. 16, 1999

[54] ANGLED INTERCONNECT PANEL ASSEMBLY FOR TELECOMMUNICATIONS APPLICATIONS

[75] Inventors: John J. Milner, Milford; Michael R. O'Conner, Seymour; Gregg J. Lafontaine, Lebanon; Alan C. Miller, Madison; William G. Sobieski, Guilford, all of Conn.

[73] Assignee: Hubbell Incorporated, Orange, Conn.

[21] Appl. No.: 08/953,150

[22] Filed: Oct. 17, 1997

[51] Int. Cl.$^6$ ................................................ H01R 13/60
[52] U.S. Cl. .................... 439/534; 439/540.1; 439/62
[58] Field of Search ............................. 439/527, 534, 439/540.1, 541.5, 545, 43, 44, 47, 55, 59, 60, 61, 62; 361/644, 645

[56] References Cited

U.S. PATENT DOCUMENTS

| | | | |
|---|---|---|---|
| 3,662,225 | 5/1972 | Carter et al. | 174/138 |
| 4,047,242 | 9/1977 | Jakob et al. | 361/389 |
| 4,498,717 | 2/1985 | Reimer | 439/551 |
| 4,527,312 | 7/1985 | Ruehl et al. | 174/138 |
| 5,398,161 | 3/1995 | Roy | 361/727 |
| 5,659,650 | 8/1997 | Arnett . | |

OTHER PUBLICATIONS

Hubbell Publication "Optical Fiber Solutions" Jan.1, 1996.

*Primary Examiner*—Lincoln Donovan
*Attorney, Agent, or Firm*—Jerry M. Presson; Michael R. Swartz

[57] ABSTRACT

An angled interconnect panel assembly includes an enclosure, a plurality of support brackets mounted inside the enclosure, a plurality of interconnect panels which are each pivotally mounted to one of the support brackets and are each disposed in an angled position when at rest between adjacent support brackets, and a pair of key-operated lock mechanisms for locking or holding the interconnect panels in their angled positions. The enclosure has a pair of opposite end walls and defines wire entry ports in the end walls. One wire entry port is for passage of user wiring into the assembly while the other of the wire entry ports is for passage of technician wiring into the assembly. Each interconnect panel has opposite user and technician sides and defines a plurality of openings extending between the opposite user and technician sides for receiving one or more interconnection members. The assembly also includes a pair of front closure doors. The pair of key-operated lock mechanisms, in combination with the front closure doors, makes it necessary to use a key to obtain access to a technician portion of the assembly while access to a user portion of the assembly is open and available. The angled position of each of the interconnect panels permits maximum wire density and use of the assembly.

15 Claims, 4 Drawing Sheets

ANGLED INTERCONNECT PANEL ASSEMBLY FOR TELECOMMUNICATIONS APPLICATIONS

BACKGROUND OF THE INVENTION

1. Field of the Invention

The present invention generally relates to enclosure boxes for communications wiring and, more particularly, is concerned with an angled interconnect panel assembly for telecommunications applications.

2. Description of the Prior Art

The organization and management of voice and data telecommunications networks in building and office environments involves the provision of interconnect panel assemblies in or near work areas. These interconnect panel assemblies establish connection points for both horizontal and vertical runs of cables with one another or with patch cords providing routing to work stations. These interconnect panel assemblies further facilitate terminations between the horizontal cables and patch cords which remain undisturbed when the patch cords leading to the work stations have to be reconfigured to make changes in work station arrangements.

One prior art interconnect panel assembly, which is manufactured and sold by Hubbell Premise Wiring, Inc., a subsidiary of Hubbell Incorporated, of Stonington, Conn., includes a box or enclosure having a back wall with pairs of opposite end walls and side walls defining an interior cavity and an open front, and an interconnect panel mounted within the box or enclosure perpendicular to the back wall and extending across the interior cavity between opposite side walls of the box or enclosure so as to divide the interior cavity thereof into separate technician and user chambers on opposite sides of the interconnect panel. These opposite sides of the interconnect panel are thus referred to respectively as the technician side and the user side. A pair of front closure doors which can be referred to as the technician door and the user door are hinged to the opposite end walls of the enclosure and can be closed and locked independently of one another relative to the interconnect panel so as to close the respective separate technician and user chambers. The technician door has an externally accessible key-operated lock which can only be opened by a technician who has the key and not by the user. On the other hand, the user door is a screw fastener which can be turned by anyone to lock and unlock the user door. The interconnect panel has slots through which a plurality of devices in the form of adapters or connectors are fitted to and supported on the interconnect panel. Entry openings are provided through walls of the enclosure proximate the respective technical and user chambers to allow insertion of the ends of cabling such as fiber optic cables into the one chamber on the technician side of the interconnect panel and optical patch cords into the other chamber on the user side of the interconnect panel. The connectors have faces exposed on the technician side of the interconnect panel to which the ends of the fiber optic cables can be connected and faces exposed on the user side of the interconnect panel into which jacks or the like on the ends of the optical patch cords can be plugged. The chambers are also large enough to store therein slack portions of the cables and patch cords.

This one prior art interconnect panel assembly has performed well and has achieved general acceptance among optical fiber interconnect products in the commercial marketplace. However, as with all products, a need may arise from time to time for improvements which will enhance performance and eliminate drawbacks which have been discovered during use of the product.

SUMMARY OF THE INVENTION

The present invention provides an angled interconnect panel assembly for telecommunications applications designed to satisfy the aforementioned need. The angled interconnect panel assembly of the present invention is constructed such that an angled orientation of one or more interconnect panels permits maximum wire density and use of the assembly while access to a technician portion of the assembly still requires a key while access to a user portion of the assembly is open and available.

Accordingly, the present invention is directed to an angled interconnect panel assembly which comprises: (a) an enclosure; (b) a plurality of support brackets mounted inside the enclosure; (c) at least one interconnect panel pivotally mounted to one of the support brackets and being disposed in an angled position within the enclosure when at rest between adjacent support brackets; and (d) locking means for locking the interconnect panel in the angled position. The enclosure has a back wall, a pair of opposite end walls and a pair of opposite side walls, all being interconnected to define an interior cavity and a front opening. Respective ones of the walls of the enclosure, such as the opposite end walls thereof, proximate to opposite sides of the interconnect panel defines wire entry ports for insertion of wiring therethrough. The one of the wire entry ports in a first of the opposite end walls is for passage of user wiring into the assembly while the other of the wire entry ports in a second of the opposite end walls is for passage of technician wiring into the assembly.

The support brackets are disposed in the interior cavity defined by the enclosure and extend between and are connected with the opposite side walls of the enclosure. The support brackets are located in spaced apart relation with respect to one another and include, at least first and second support brackets and preferably a third support bracket. The first support bracket is located adjacent to the first opposite end wall of the enclosure. The first support bracket has a lower portion and an upper portion. The first support bracket defines a passageway for insertion of wiring therethrough. The second support bracket is located adjacent to the second opposite end wall of the enclosure. The second support bracket has a main portion, an upper end, a lower end, an inclined ledge portion extending from the upper end, and a flange extending from the main portion below the upper end and in the opposite direction of the inclined ledge portion. The lower end of the second support bracket is spaced above the back wall of the enclosure such that a gap exists therebetween so as to allow for insertion of wiring therethrough. The third support bracket is located between the first and second support brackets. The third support bracket has a lower portion, an upper portion and an inclined ledge portion extending from the upper portion. The third support bracket also defines a passageway for insertion of wiring therethrough. The passageway is preferably formed through the lower portion.

While at least one interconnect panel can be provided, the assembly preferably has at least a pair of the interconnect panels. Each of the interconnect panels has opposite user and technician sides and defines at least one and preferably a plurality of openings extending between the opposite user and technician sides for receiving at least one and preferably a plurality of interconnection members each having opposite faces which define connection means thereon. The interconnection members are supported on the interconnect panel at the openings therein such that the connection means defined by the opposite faces of each interconnection member are respectively disposed adjacent to the opposite user and technician sides of the interconnect panel.

If only one interconnect panel is present, it is connected to the lower portion of the first support bracket so as to undergo pivotal movement relative to the first support bracket between first and second positions. In the first position, the interconnect panel rests in an inclined orientation against the inclined ledge portion of the second support bracket allowing access to the user side of the interconnect panel. In the second position, the interconnect panel rests in an inclined orientation against the upper portion of the first support bracket allowing access to the technician side of the interconnect panel.

If at least a pair of the interconnect panels are present, the first interconnect panel is connected to the lower portion of the first support bracket so as to undergo pivotal movement relative to the first and third support brackets between first and second positions. In the first position, the first interconnect panel rests in an inclined orientation against the inclined ledge portion of the third support bracket allowing access to the user side of the first interconnect panel. In the second position, the first interconnect panel rests in an inclined orientation against the upper portion of the first support bracket allowing access to the technician side of the first interconnect panel. The second interconnect panel is connected to the lower portion of the third support bracket so as to undergo pivotal movement relative to the second and third support brackets between first and second positions. In the first position, the second interconnect panel rests in an inclined orientation against the inclined ledge portion of the second support bracket allowing access to the user side of the second interconnect panel. In the second position, the second interconnect panel rests in an inclined orientation against the upper portion of the third support bracket allowing access to the technician side of the second interconnect panel.

The assembly may also include a pair of front closure doors, those being a technician door and a user door. The technician door is mounted adjacent to the second end wall of the enclosure so as to undergo pivotal movement toward and away from the second support bracket and correspondingly between closed and opened positions relative to the second interconnect panel in which the technician door correspondingly blocks and allows pivotal movement of the second interconnect panel between its first and second positions relative to the second support bracket. The user door is mounted adjacent to the first end wall of the enclosure so as to undergo pivotal movement toward and away from the third support bracket and correspondingly between closed and opened positions relative to the first interconnect panel in which the user door correspondingly covers and uncovers the first interconnect panel.

The locking means is preferably a key-operated lock mechanism which includes a technician lock and key for locking the at least one interconnect panel in its first position or, preferably, includes a first technician lock and key for locking the first interconnect panel in its first position and a second technician lock and key for holding the second interconnect panel in its first position. The first technician lock is mounted on the first interconnect panel. The first technician lock is actuatable by use of the first technician key between locked and unlocked conditions. If only one interconnect panel is present, the actuation occurs relative to the inclined ledge portion of the second support bracket when the interconnect panel is in its first position. If at least a pair of the interconnect panels are present, the actuation occurs relative to the inclined ledge portion of the third support bracket when the first interconnect panel is in its first position. The first technician lock when in its locked condition prevents pivotal movement of the first interconnect panel between its first and second positions and when in its unlocked condition allows pivotal movement of the first interconnect panel between its first and second positions. Furthermore, the first technician lock is spaced from a closed user door through a distance that is shorter than the height of the first technician key extending from the first technical lock so as to prevent movement of the user door to the closed position when the first technician key is left in the first technician lock. The second technician lock is mounted on the technician door. The second technician lock is actuatable by use of the second technician key between locked and unlocked conditions relative to the flange of the second support bracket when the technician door is in its closed position and the second interconnect panel is in its first position. The second technician lock when in its locked condition prevents pivotal movement of the second interconnect panel between its first and second positions and when in its unlocked condition allows pivotal movement of the second interconnect panel between its first and second positions.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
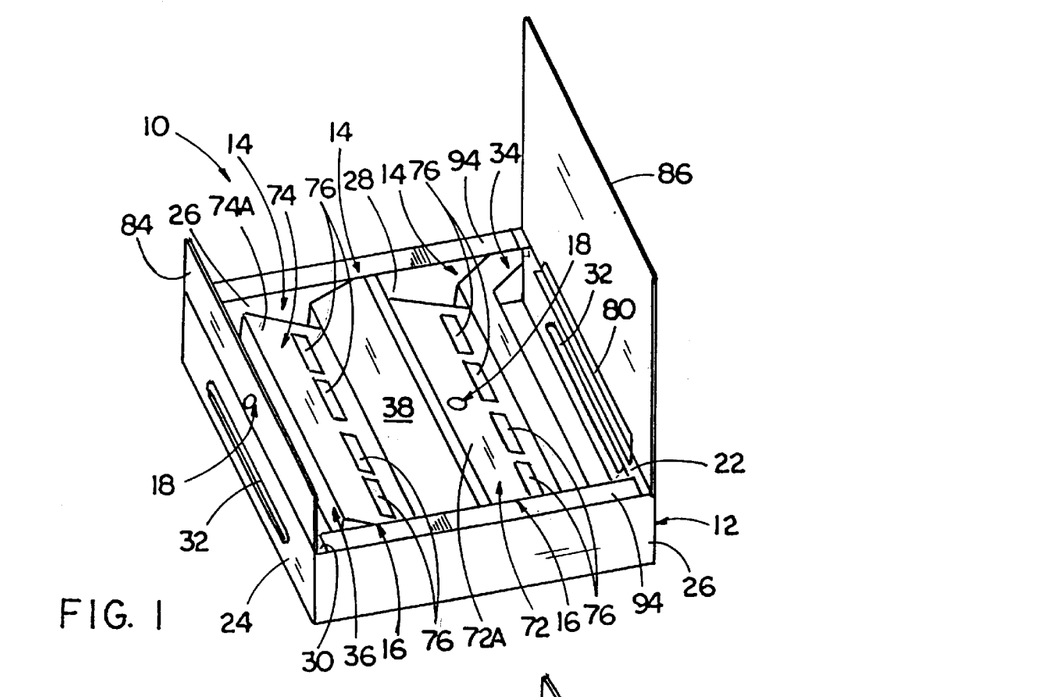
FIG. 1 is a top perspective view of an angled interconnect panel assembly of the present invention with interconnect panels of the assembly in their first positions and front closure doors of the assembly in their opened positions.
Figure 2:
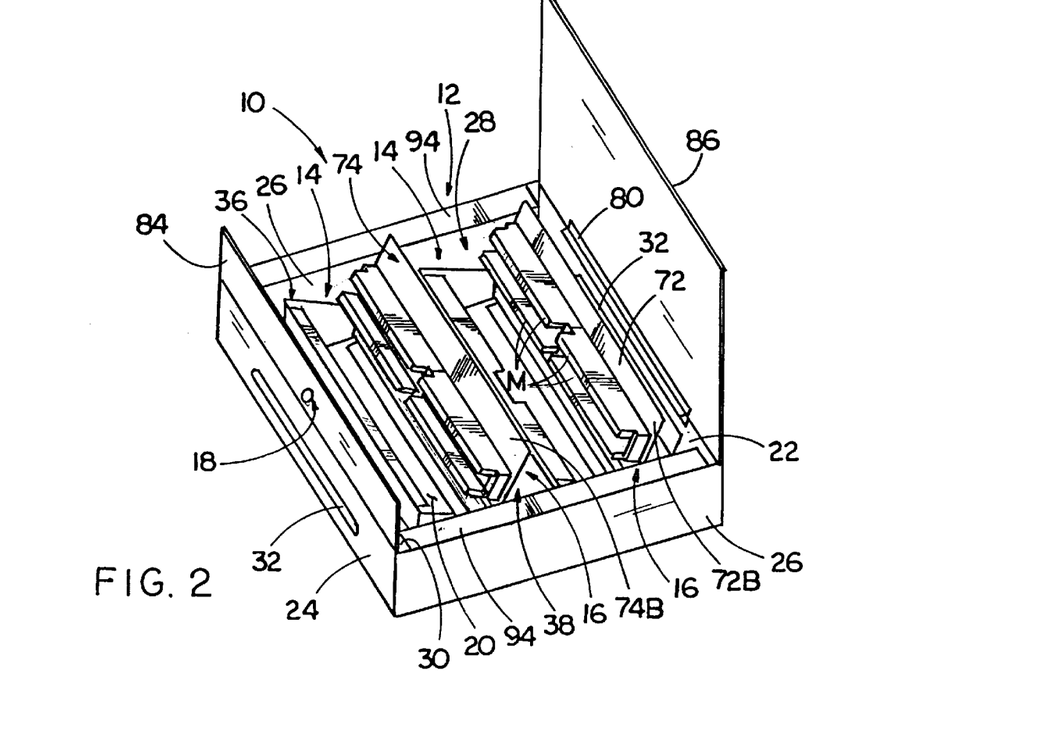
FIG. 2 is a top perspective view of the angled interconnect panel assembly with interconnect panels in their second positions and front closure doors in their opened positions.
Figure 3:
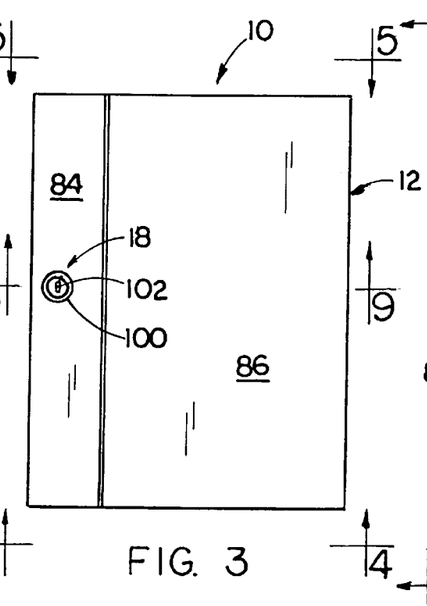
FIG. 3 is a top plan view of the assembly with front closure doors in their closed positions.
Figure 4:
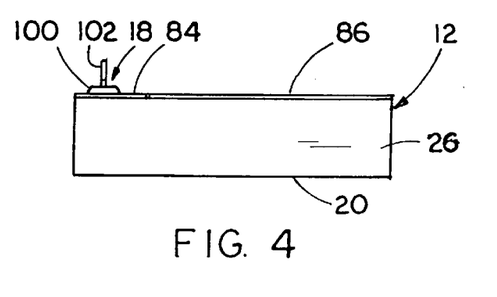
FIG. 4 is a side elevational view of the assembly as seen along line 4—4 of FIG. 3.
Figure 5:
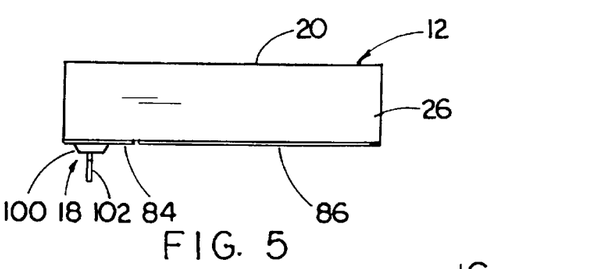
FIG. 5 is a side elevational view of the assembly as seen along line 5—5 of FIG. 3.
Figure 6:
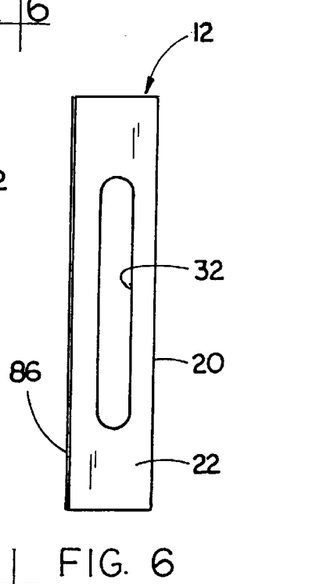
FIG. 6 is an end elevational view of the assembly as seen along line 6—6 of FIG. 3.
Figure 7:
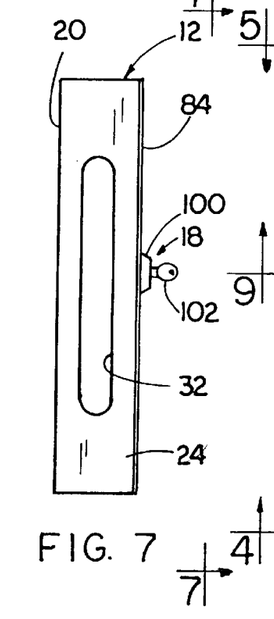
FIG. 7 is an end elevational view of the assembly as seen along line 7—7 of FIG. 3.
Figure 8:
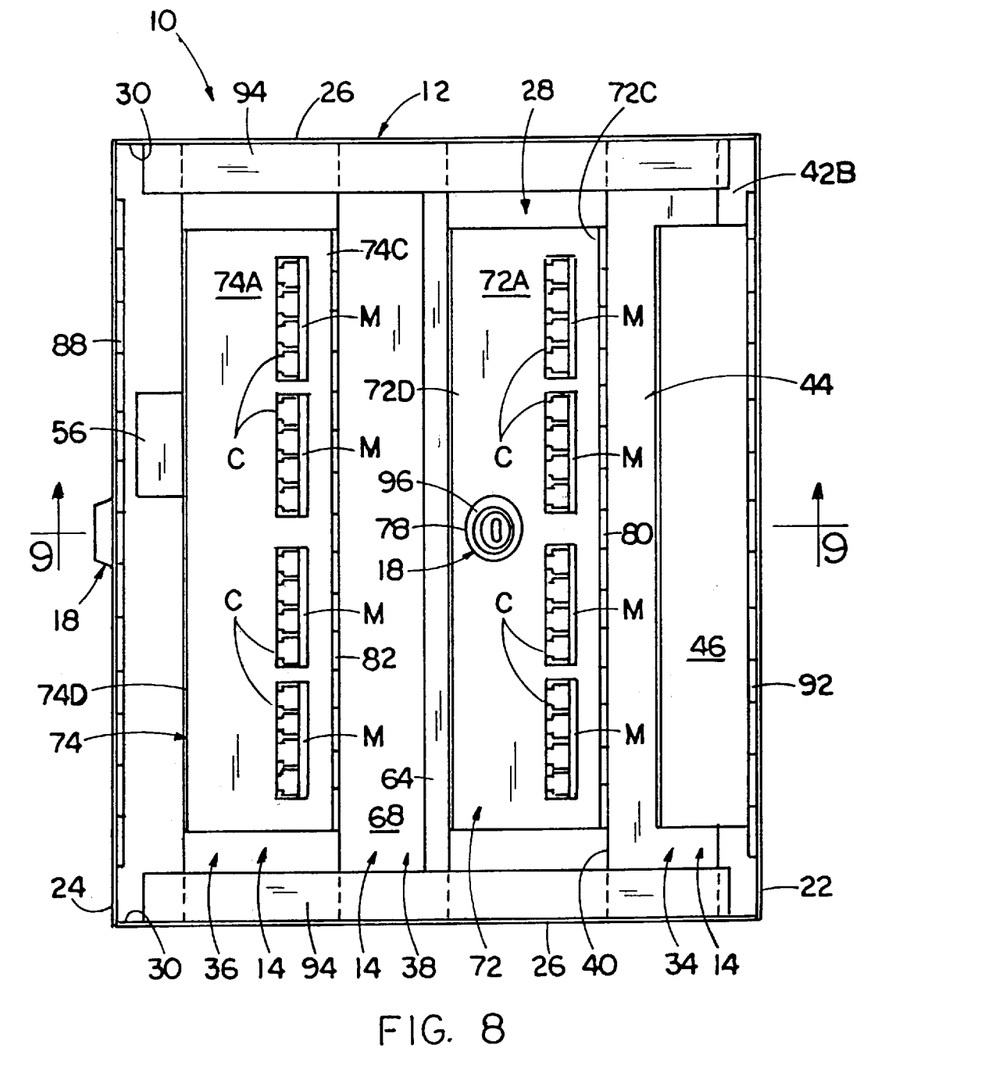
FIG. 8 is an enlarged top plan view of the assembly with front closure doors in their opened positions.
Figure 9:
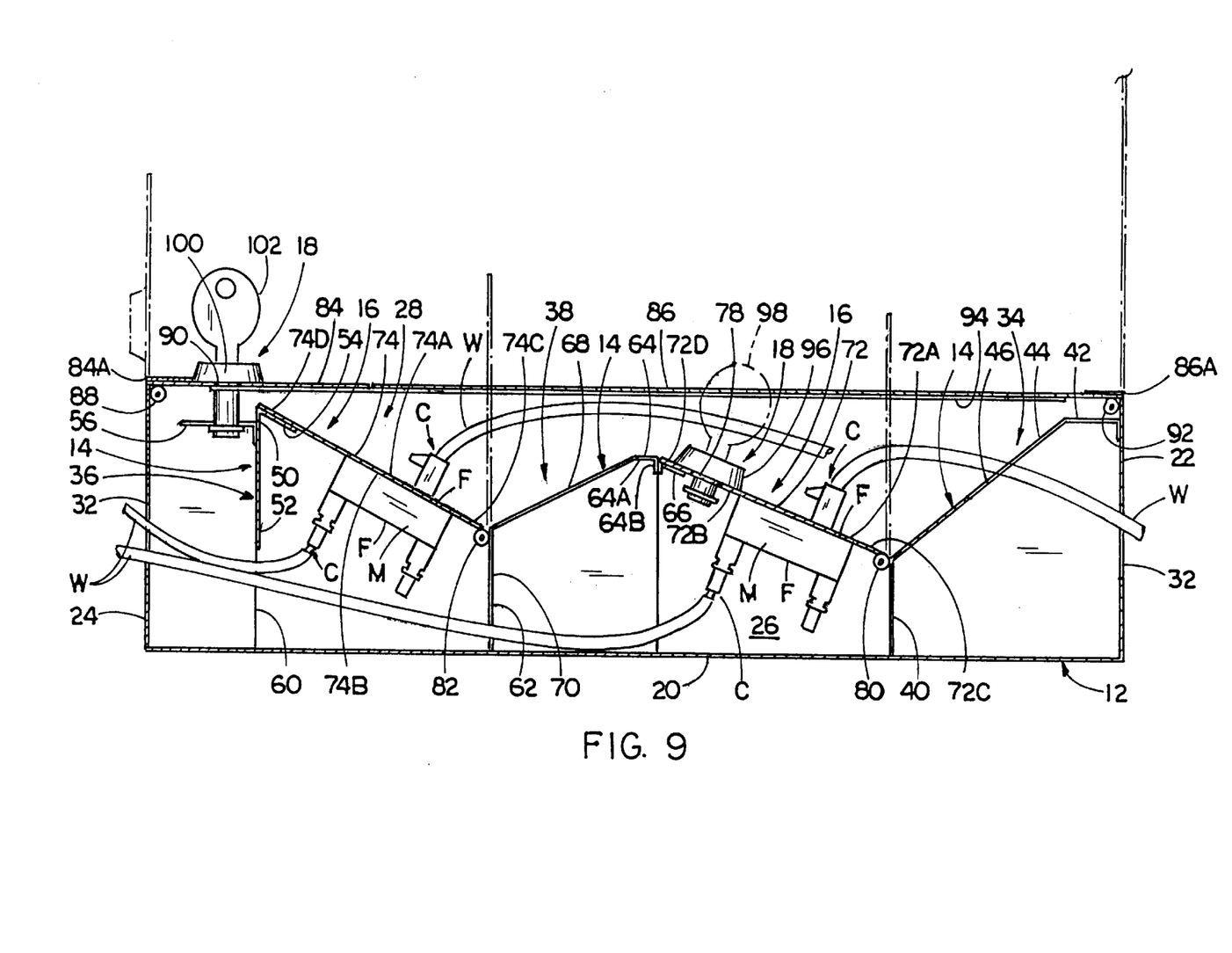
FIG. 9 is an enlarged sectional view of the assembly as seen along line 9—9 of FIG. 3.

Referring to the drawings and particularly to FIGS. 1, 2 and 9, there is illustrated an angled interconnect panel assembly, generally designated 10, of the present invention. The angled interconnect panel assembly 10 basically includes an enclosure 12, a plurality of support brackets 14 mounted inside the enclosure 12, at least one interconnect panel 16 pivotally mounted to one of the support brackets 14 and being disposed in an angled position within the enclosure 12 when at rest between adjacent support brackets 14, and locking means 18 for locking the at least one interconnect panel 16 in the angled position. These basic components of the angled interconnect panel assembly 10 are comprised of a substantially rigid material, such as metal. Walls of the enclosure 12, support brackets 14 and the at least one interconnect panel 16 are all substantially flat in shape, but may have any other suitable configuration and any suitable size, though preferably have embodiments as described basically above and more detailed below.

Referring now to FIGS. 1–9, the enclosure 12 has a back wall 20, a pair of opposite end walls 22, 24 and a pair of opposite side walls 26, all being interconnected to define an interior cavity 28 and a front opening 30. Each of the opposite end walls 22, 24 defines one of a pair of wire entry ports 32 for insertion of wiring W therethrough. Each of the wire entry ports 32 has a substantially elongated and oblong configuration, but may have any other suitable shape, and is disposed along a substantially central location of the respective opposite end wall 22, 24. The one wire entry port 32 in the first opposite end wall 22 is for passage of user wiring into the assembly 10 while the other of the wire entry ports 32 in the second opposite end wall 24 is for passage of technician wiring into the assembly 10. As used herein, the terms "at an angle, inclined or angled" mean that the part referred to intersects a plane which is perpendicular to the back wall 20 of the enclosure 12.

The support brackets 14 are disposed in the interior cavity 28 defined by the enclosure 12 and extend between and are connected with the opposite side walls 26 of the enclosure 12. The support brackets 14 are located in spaced apart relation with respect to one another and include, at least first and second support brackets 34, 36, and preferably a third support bracket 38 as well.

The first support bracket 34 is located adjacent to the first opposite end wall 22 of the enclosure 12. The first support bracket 34 has a lower portion 40 and an upper portion 42. The lower portion 40 is disposed closer to the back wall 20 of the enclosure 12 and farther from the first end wall 22 of the enclosure 12 than is the upper portion 42. The lower portion 40 preferably extends to the back wall 20 of the enclosure 12. The lower portion 40 is substantially vertical, but may have any other suitable alignment. The upper portion 42 preferably extends to the first end wall 22 of the enclosure 12. The upper portion 42 has a substantially L-shaped configuration with a longer segment 42A being substantially horizontal and a shorter segment 42B being substantially vertical. The shorter segment 42B is also parallel and connected to the first end wall 22. The upper portion 42 may have any other suitable alignment. The lower portion 40 is greater in height than the distance of extension of the upper portion 42 from the first end wall 22, but the lower and upper portions 40, 42 may have any other suitable size in relation to one another. The first support bracket 34 further has an inclined middle portion 44 extending between and interconnected with the lower and upper portions 40, 42. The inclined middle portion 44 extends between the lower and upper portions 40, 42 a distance substantially greater than the height of the lower portion 40. The first support bracket 34 also defines a passageway 46 for insertion of wiring W therethrough. The passageway 46 may have any suitable shape and size. The passageway 46 is preferably formed through the inclined middle portion 44, but may alternatively be a gap between the lower and upper portions 40, 42.

The second support bracket 36 is located adjacent to the second opposite end wall 24 of the enclosure 12. The second support bracket 36 has a main portion 48, an upper end 50, a lower end 52, an inclined ledge portion 54 extending from the upper end 50, and a flange 56 extending from the main portion 48 below the upper end 50 and in the opposite direction of the inclined ledge portion 54. The main portion 48 is substantially vertical, but may have any other suitable alignment. The inclined ledge portion 54 extends from the upper end 50 toward the interior of the enclosure 12 so as to make an acute angle with the main portion 48 and for a distance which is substantially less than the height of the main portion 48, although the inclined ledge portion 54 and main portion 48 may have any other suitable size in relation to one another. The flange 56 extends from the main portion 48 toward the exterior of the enclosure 12 so as to make a right angle with the main portion 48, but may have any other suitable alignment, and for a distance which is less than the height of the main portion 48 but greater than the distance of the extension of the inclined ledge portion 54, but may have any other suitable size in relation to the main portion 48 and inclined ledge portion 54. The lower end 52 of the second support bracket 36 is spaced above the back wall 20 of the enclosure 12 such that a gap 60 exists therebetween so as to allow for insertion of wiring W therethrough.

The third support bracket 38 is located between the first and second support brackets 34, 36. The third support bracket 38 has a lower portion 62, an upper portion 64 and an inclined ledge portion 66 extending from the upper portion 64. The lower portion 62 is disposed closer to the back wall 20 and the second end wall 24 of the enclosure 12 and is farther from the first end wall 22 of the enclosure 12 than is the upper portion 64. The lower portion 62 preferably extends to the back wall 20 of the enclosure 12. The lower portion 62 is disposed farther from the second end wall 24 of the enclosure 12 than is the inclined ledge portion 54 of the second support bracket 36. The inclined ledge portion 66 of the third support bracket 38 is disposed farther from the back wall 20 of the enclosure 12 and farther from the first end wall 22 of the enclosure 12 than is the lower portion 40 of the first support bracket 34. The lower portion 62 is substantially vertical, but may have any other suitable alignment. The upper portion 64 has a substantially L-shaped configuration with a longer segment 64A being substantially horizontal and a shorter segment 64B being substantially vertical. The shorter segment 64B is also parallel and connected to the inclined ledge portion 66. The upper portion 64 may have any other suitable alignment. The lower portion 62 is substantially greater in height than the distance of the extension of the longer segment 64A of the upper portion 64, but the lower and upper portions 62, 64 may have any other suitable size in relation to one another. The inclined ledge portion 66 has a substantially slanted L-shaped configuration with a longer segment 66A being substantially inclined and a shorter segment 66B being substantially vertical. The shorter segment 66B is also parallel and connected to and extends the same distance as the shorter segment 64B of the upper portion 64. The longer segment 66A extends a distance slightly greater than that of the longer segment 64A of the upper portion 64. The longer segment 66A particularly extends from the upper portion 62 toward the first end wall 22 so as to make an acute angle with the shorter segment 66B. The inclined ledge portion 66 may have any other suitable alignment and size. The third support bracket 38 further has an inclined middle portion 68 extending between and interconnected with the lower and upper portions 62, 64. The inclined middle portion 68 extends between the lower and upper portions 62, 64 a distance slightly greater than the height of the lower portion 62. The third support bracket 38 also defines a passageway 70 for insertion of wiring W therethrough. The passageway 70 may have any suitable shape and size. The passageway 70 is preferably formed through the lower portion 62, but may alternatively be a gap between the lower portion 62 and the bottom wall 20 of the enclosure 12.

The assembly 10 may have one interconnect panel 16 but preferably has a pair of interconnect panels 72, 74 which are hereafter referred to as first and second interconnect panels 72, 74. Tand suitable number of in other desired and suitable number of interconnect panels 16. Each of the first and second interconnect panels 72, 74 has opposite user and technician sides 72A, 72B and 74A, 74B and defines at least one and preferably a plurality, such as four, openings 76 therein extending between the opposite user and technician sides 72A, 72B and 74A, 74B for receiving at least one and preferably a plurality, such as four, interconnection members M each having opposite faces F which define connection means C thereon. The interconnection members M are supported on the first and second interconnect panels 72, 74 through the openings 76 such that the connection means C defined by the opposite faces F of each interconnection member M are disposed adjacent to the opposite user and technician sides 72A, 72B and 74A, 74B of the interconnect panels 72, 74. As best seen in FIG. 9, the user side 72A, 74A of respective interconnect panels 72 and 74 refer to the top side of panels 72, 74; whereas, the opposite bottom side of the respective interconnect panels 72 and 74 is referred to as the technician side 72B, 74B of panels 72, 74. The openings 76 are spaced apart from one another with each having a substantially elongated and rectangular configuration, but may have any other suitable shape. The openings 76 are preferably disposed closer to a lower edge 72C, 74C than to an upper edge 72D, 74D of the respective interconnect panel 72, 74, but may be in any other suitable location on the interconnect panel 72, 74. The first interconnect panel 72 further defines a hole 78 closer to the upper edge 72D than to the lower edge 72C thereto. The hole 78 has a substantially annular configuration, though may have any other suitable shape.

If only one interconnect panel 16 was present, the third support bracket 38 would be omitted and the one interconnect panel 16 would be connected to the lower portion 40 of the first support bracket 34 so as to undergo pivotal movement relative to the first support bracket 34 between first and second positions. In the first position, the one interconnect panel 16 would rest in an inclined orientation against the inclined ledge portion 54 of the second support bracket 36 allowing access to the user side of the interconnect panel 16. In the second position, the one interconnect panel 16 would rest in an inclined orientation against the upper portion 42 of the first support bracket 34 allowing access to the technician side of the interconnect panel 16.

When a plurality of the interconnect panels 16 are present, such as for example the first and second interconnect panels 72, 74 illustrated in FIGS. 1, 2, 8 and 9, the third support bracket 38 is then present and the first interconnect panel 72 is connected to the lower portion 40 of the first support bracket 34 so as to undergo pivotal movement relative to the first and third support brackets 34, 38 between first and second positions. In the first position, the first interconnect panel 72 rests in an inclined orientation against the inclined ledge portion 66 of the third support bracket 38 allowing access to the user side 72A of the first interconnect panel 72. In the second position, the first interconnect panel 72 rests in an inclined orientation against the upper portion 42 of the first support bracket 34 allowing access to the technician side 72B of the first interconnect panel 72. Also, the first interconnect panel 72 is mounted at its lower edge 72C to a first hinge 80 which is mounted to the first support bracket 34 at the location of juncture of the lower portion 40 and the inclined middle portion 44. The second interconnect panel 74 is connected to the lower portion 62 of the third support bracket 38 so as to undergo pivotal movement relative to the second and third support brackets 36, 38 between first and second positions. In the first position, the second interconnect panel 74 rests in an inclined orientation against the inclined ledge portion 54 of the second support bracket 36 allowing access to the user side 74A of the second interconnect panel 74. In the second position, the second interconnect panel 74 rests in an inclined orientation against the upper portion 64 of the third support bracket 38 allowing access to the technician side 74B of the second interconnect panel 74. Also, the second interconnect panel 74 is mounted at its lower edge 74C to a second hinge 82 which is mounted to the third support bracket 38 at the location of juncture of the lower portion 62 and the inclined middle portion 68.

The assembly 10 may also include a pair of front closure doors, those being a technician door 84 and a user door 86. Each of the technician and user doors 84, 86 has a substantially rectangular configuration, but may have any other suitable shape. The technician door 84 is mounted adjacent to the second end wall 24 of the enclosure 12 so as to undergo pivotal movement toward and away from the second support bracket 36 and correspondingly between closed and opened positions relative to the second interconnect panel 74. In the closed and opened positions, the technician door 84 correspondingly blocks and allows pivotal movement of the second interconnect panel 74 between its first and second positions relative to the second support bracket 36. The technician door 84 is mounted at an outer end edge 84A thereof to a third hinge 88 which is mounted to the second end wall 24 of the enclosure 12. Also, the technician door 84 defines a hole 90 having a substantially annular configuration, but may have any other suitable shape. The user door 86 is mounted adjacent to the first end wall 22 of the enclosure 12 so as to undergo pivotal movement toward and away from the third support bracket 38 and correspondingly between closed and opened positions relative to the first interconnect panel 72. In the closed and opened positions, the user door 86 correspondingly covers and uncovers the first interconnect panel 72. The user door 86 is mounted at an outer end edge 86A to a fourth hinge 92 which is mounted to the first end wall 22 of the enclosure 12. The user door 86 has a size which is substantially greater than that of the technician door 84, though both front doors 84, 86 may have any suitable size in relation to one another. Also, each of the opposite side walls 26 of the enclosure 12 may include a ledge portion 94 which extends from a top thereof and in substantially perpendicular relation thereto and toward the other ledge portion 94 on the opposite side wall 26 of the enclosure 12. Each of the technician and user doors 84, 86 may rest on these ledge portions 94 when the doors 84, 86 are in their closed positions. Each ledge portion 94 extends only so far such that it does not interfere with movements of the first and second interconnect panels 72, 74.

The locking means 18 is preferably a key-operated lock mechanism which includes a technician lock and key for locking the interconnect panel 16 in its first position. In the illustrated embodiment where there is the first and second interconnect panels 72, 74, the locking means 18 includes a first technician lock and key 96, 98, 110 for locking the first interconnect panel 72 in its first position and a second technician lock and key 100, 102 for holding the second interconnect panel 74 in its first position. The first technician lock 96 is disposed in the hole 78 defined by and mounted on the first interconnect panel 72 closer to the upper edge 72D than to the lower edge 72C thereof, but may also be mounted at any other suitable location. The first technician lock 96 is actuatable by use of the first technician key 98 between locked and unlocked conditions. If only one interconnect panel 16 is present, the actuation occurs relative to the inclined ledge portion 54 of the second support bracket 36 when the interconnect panel 16 is in its first position. If the first and second interconnect panels 72, 74 are present, the actuation occurs relative to the inclined ledge portion 66 of the third support bracket 38 when the first interconnect panel 72 is in its first position. The first technician lock 96 when in its locked condition prevents pivotal movement of the first interconnect panel 72 between its first and second positions and when in its unlocked condition allows pivotal movement of the first interconnect panel 72 between its first and second positions. Furthermore, the first technician lock 96 is spaced from a closed user front door 86 through a distance that is shorter than the height of the first technician key 98 extending from the first technical lock 96 so as to prevent movement of the user door 86 to the closed position when the first technician key 98 is left in the first technician lock 96. The second technician lock 100 is disposed in the hole 90 defined by and mounted on the technician front door 84. The second technician lock 100 is actuatable by use of the second technician key 102 between locked and unlocked conditions relative to the flange 56 of the second support bracket 36 when the technician door 84 is in its closed position and the second interconnect panel 74 is in its first position. The second technician lock 100 when in its locked condition prevents pivotal movement of the second interconnect panel 74 between its first and second positions and when in its unlocked condition allows pivotal movement of the second interconnect panel 74 between its first and second positions.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. An angled interconnect panel support assembly, comprising:
   (a) an enclosure having a back wall, a pair of opposite end walls and a pair of opposite side walls, all being interconnected to define an interior cavity and a front opening, each of said opposite end walls defining one of a pair of wire entry ports for insertion of wiring therethrough;
   (b) a plurality of support brackets disposed in said interior cavity defined by said enclosure and extending between and connected with said opposite side walls of said enclosure and being located in spaced apart relation with respect to one another and including
      (i) a first support bracket located adjacent to a first of said opposite end walls of said enclosure, said first support bracket having a lower portion and an upper portion with said lower portion being disposed closer to said back wall of said enclosure and farther from said first end wall of said enclosure than is said upper portion, and
      (ii) a second support bracket located adjacent to a second of said opposite end walls of said enclosure, said second support bracket having a main portion, an upper end and an inclined ledge portion extending from said upper end;
   (c) an interconnect panel disposed in said interior cavity and having opposite top user and bottom technician sides and at least one opening defined therein for receiving therethrough and supporting thereon at least one interconnection member, said at least one interconnection panel having opposite faces defining connection means thereon which are respectively disposed adjacent to said opposite top user and bottom technician sides of said interconnect panel, said interconnect panel being connected to said lower portion of said first support bracket so as to undergo pivotal movement relative to said first support bracket between first and second positions in which said interconnect panel in said first position rests in an inclined orientation against said inclined ledge portion of said second support bracket allowing access to said top user side of said interconnect panel and in said second position rests in an inclined orientation against said upper portion of said first support bracket allowing access to said bottom technician side of said interconnect panel; and
   (d) means for locking said interconnect panel in said first position.

2. The assembly as recited in claim 1, wherein said first support bracket defines a passageway for insertion of wiring therethrough.

3. The assembly as recited in claim 1, wherein said second support bracket further has a lower end spaced above said back wall of said enclosure such that a gap exists therebetween so as to allow for insertion of wiring therethrough.

4. The assembly as recited in claim 1, wherein said interconnect panel defines a plurality of openings being spaced apart from one another and each having a substantially similar configuration for receiving a plurality of the interconnection members.

5. The assembly as recited in claim 1, wherein said locking means is a key-operated lock mechanism which includes a technician lock and key, said technician lock being mounted on said interconnect panel and actuatable by use of said technician key between locked and unlocked conditions relative to said inclined ledge portion of said second support bracket when said interconnect panel is in said first position, said technician lock when in said locked condition preventing pivotal movement of said interconnect panel between said first and second positions and when in said unlocked condition allowing pivotal movement of said interconnect panel between said first and second positions.

6. An angled interconnect panel support assembly, comprising:
   (a) an enclosure having a back wall, a pair of opposite end walls and a pair of opposite side walls, all being interconnected to define an interior cavity and a front opening, each of said opposite end walls defining one of a pair of wire entry ports for insertion of wiring therethrough;
   (b) a plurality of support brackets disposed in said interior cavity defined by said enclosure and extending between and connected with said opposite side walls of said enclosure and being located in spaced apart relation with respect to one another and including
      (i) a first support bracket located adjacent to a first of said opposite end walls of said enclosure, said first support bracket having a lower portion and an upper portion with said lower portion being disposed closer to said back wall of said enclosure and farther from said first end wall of said enclosure than is said upper portion, (ii) a second support bracket located adjacent to a second of said opposite end walls of said enclosure, said second support bracket having a main portion, an upper end and an inclined ledge portion extending from said upper end, and (iii) a third support bracket located between said first and second support brackets, said third support bracket having a lower portion, an upper portion and an inclined ledge portion extending from said upper portion with said lower portion being disposed closer to said back wall and said second end wall of said enclosure and farther from said first end wall of said enclosure than is said upper portion and farther from said second end wall of said enclosure than is said inclined ledge portion of said second support bracket and with said inclined ledge portion of said third support bracket being disposed farther from said back wall of said enclosure and farther from said first end wall of said enclosure than is said lower portion of said first support bracket;

(c) a plurality of interconnect panels disposed in said interior cavity defined by said enclosure in spaced apart relation with respect to one another, each of said interconnect panels having opposite top user and bottom technician sides and a plurality of openings defined therein for receiving therethrough and supporting thereon a plurality of interconnection members, said plurality of interconnection members having opposite faces defining connection means thereon which are respectively disposed adjacent to said opposite top user and bottom technician sides of said interconnect panels, said interconnect panels including (i) a first interconnect panel connected to said lower portion of said first support bracket so as to undergo pivotal movement relative to said first and third support brackets between first and second positions in which said first interconnect panel in its said first position rests in an inclined orientation against said inclined ledge portion of said third support bracket allowing access to said top user side of said first interconnect panel and in its said second position rests in an inclined orientation against said upper portion of said first support bracket allowing access to said bottom technician side of said first interconnect panel, and (ii) a second interconnect panel connected to said lower portion of said third support bracket so as to undergo pivotal movement relative to said second and third support brackets between first and second positions in which said second interconnect panel in its said first position rests in an inclined orientation against said inclined ledge portion of said second support bracket allowing access to said top user side of said second interconnect panel and in its said second position rests in an inclined orientation against said upper portion of said third support bracket allowing access to said bottom technician side of said second interconnect panel; and (d) means for locking said first interconnect panel in its said first position.

7. The assembly as recited in claim 6, wherein said first support bracket defines a passageway for insertion of wiring therethrough.

8. The assembly as recited in claim 6, wherein said second support bracket further has a lower end spaced above said back wall of said enclosure such that a gap exists therebetween so as to allow for insertion of wiring therethrough.

9. The assembly as recited in claim 6, wherein said lower portion of said third support bracket defines a passageway for insertion of wiring therethrough.

10. The assembly as recited in claim 6, wherein said locking means is a key-operated lock mechanism which includes a technician lock and key, said technician lock being mounted on said first interconnect panel and actuatable by use of said technician key between locked and unlocked conditions relative to said inclined ledge portion of said second support bracket when said first interconnect panel is in its said first position, said technician lock when in its said locked condition preventing pivotal movement of said first interconnect panel between its said first and second positions and when in its said unlocked condition allowing pivotal movement of said first interconnect panel between its said first and second positions.

11. An angled interconnect panel support assembly, comprising:

(a) an enclosure having a back wall, a pair of opposite end walls and a pair of opposite side walls, all being interconnected to define an interior cavity and a front opening, each of said opposite end walls defining one of a pair of wire entry ports for insertion of wiring therethrough;

(b) a plurality of support brackets disposed in said interior cavity defined by said enclosure and extending between and connected with said opposite side walls of said enclosure and being located in spaced apart relation with respect to one another and including (i) a first support bracket located adjacent to a first of said opposite end walls of said enclosure, said first support bracket having a lower portion and an upper portion with said lower portion extending to said back wall of said enclosure and being disposed farther from said first end wall of said enclosure than is said upper portion and with said upper portion extending to said first end wall of said enclosure, (ii) a second support bracket located adjacent to a second of said opposite end walls of said enclosure, said second support bracket having a main portion, an upper end, an inclined ledge portion extending from said upper end, and a flange extending from said main portion below said upper end and in the opposite direction of said inclined ledge portion, and (iii) a third support bracket located between said first and second support brackets, said third support bracket having a lower portion, an upper portion and an inclined ledge portion extending from said upper portion with said lower portion extending to said back wall of said enclosure and being disposed closer to said second end wall of said enclosure than is said upper portion and farther from said second end wall of said enclosure than is said inclined ledge portion of said second support bracket and with said inclined ledge portion of said third support bracket being disposed farther from said back wall of said enclosure and farther from said first end wall of said enclosure than is said lower portion of said first support bracket;

(c) a plurality of interconnect panels disposed in said interior cavity defined by said enclosure in spaced apart relation with respect to one another, each of said interconnect panels having opposite top user and bottom technician sides and a plurality of openings defined therein for receiving therethrough and supporting thereon a plurality of interconnection members, said plurality of interconnection members having opposite faces defining connection means thereon which are respectively disposed adjacent to said opposite user and technician sides of said interconnect panels, said interconnect panels including
- (i) a first interconnect panel connected to said lower portion of said first support bracket so as to undergo pivotal movement relative to said first and third support brackets between first and second positions in which said first interconnect panel in its said first position rests in an inclined orientation against said inclined ledge portion of said third support bracket allowing access to said top user side of said first interconnect panel and in its said second position rests in an inclined orientation against said upper portion of said first support bracket allowing access to said bottom technician side of said first interconnect panel, and
- (ii) a second interconnect panel connected to said lower portion of said third support bracket so as to undergo pivotal movement relative to said second and third support brackets between first and second positions in which said second interconnect panel in its said first position rests in an inclined orientation against said inclined ledge portion of said second support bracket allowing access to said top user side of said second interconnect panel and in its said second position rests in an inclined orientation against said upper portion of said third support bracket allowing access to said bottom technician side of said second interconnect panel;

(d) a pair of front closure doors including
- (i) a technician door mounted adjacent to said second end wall of said enclosure so as to undergo pivotal movement toward and away from said second support bracket and correspondingly between closed and opened positions relative to said second interconnect panel in which said technician door correspondingly blocks and allows pivotal movement of said second interconnect panel between its said first and second positions relative to said second support bracket, and
- (ii) a user door mounted adjacent to said first end wall of said enclosure so as to undergo pivotal movement toward and away from said third support bracket and correspondingly between closed and opened positions relative to said first interconnect panel in which said user door correspondingly covers and uncovers said first interconnect panel; and (e) a pair of key-operated lock mechanisms including
- (i) a first technician lock and key, said first technician lock being mounted on said first interconnect panel and actuatable by use of said first technician key between locked and unlocked conditions relative to said inclined ledge portion of said third support bracket when said first interconnect panel is in its said first position, said first technician lock when in its said locked condition preventing pivotal movement of said first interconnect panel between its said first and second positions and when in its said unlocked condition allowing pivotal movement of said first interconnect panel between its said first and second positions, said first technician lock being spaced from a closed said user door through a distance that is shorter than the height of said first technician key extending from said first technical lock so as to prevent movement of said user door to said closed position when said first technician key is left in said first technician lock, and
- (ii) a second technician lock and key, said second technician lock being mounted on said technician door and actuatable by use of said second technician key between locked and unlocked conditions relative to said flange of said second support bracket when said second technician door is in its said closed position and said second interconnect panel is in its said first position, said second technician lock when in its said locked condition preventing pivotal movement of said second interconnect panel between its said first and second positions and when in its said unlocked condition allowing pivotal movement of said second interconnect panel between its said first and second positions.

12. The assembly as recited in claim 11, wherein said first support bracket defines a passageway for insertion of wiring therethrough.

13. The assembly as recited in claim 11, wherein said second support bracket has a lower end spaced above said back wall of said enclosure such that a gap exists therebetween so as to allow for insertion of wiring therethrough.

14. The assembly as recited in claim 11, wherein said lower portion of said third support bracket defines a passageway for insertion of wiring therethrough.

15. The assembly as recited in claim 11, wherein each of said interconnect panels defines said plurality of openings spaced apart from one another and each having a substantially similar elongated and rectangular configuration and all together being for receiving the plurality of interconnection members.

* * * * *